Jan. 25, 1955 M. SETTLER 2,700,264
POWER DRIVE FOR LAWN MOWERS
Filed June 28, 1952
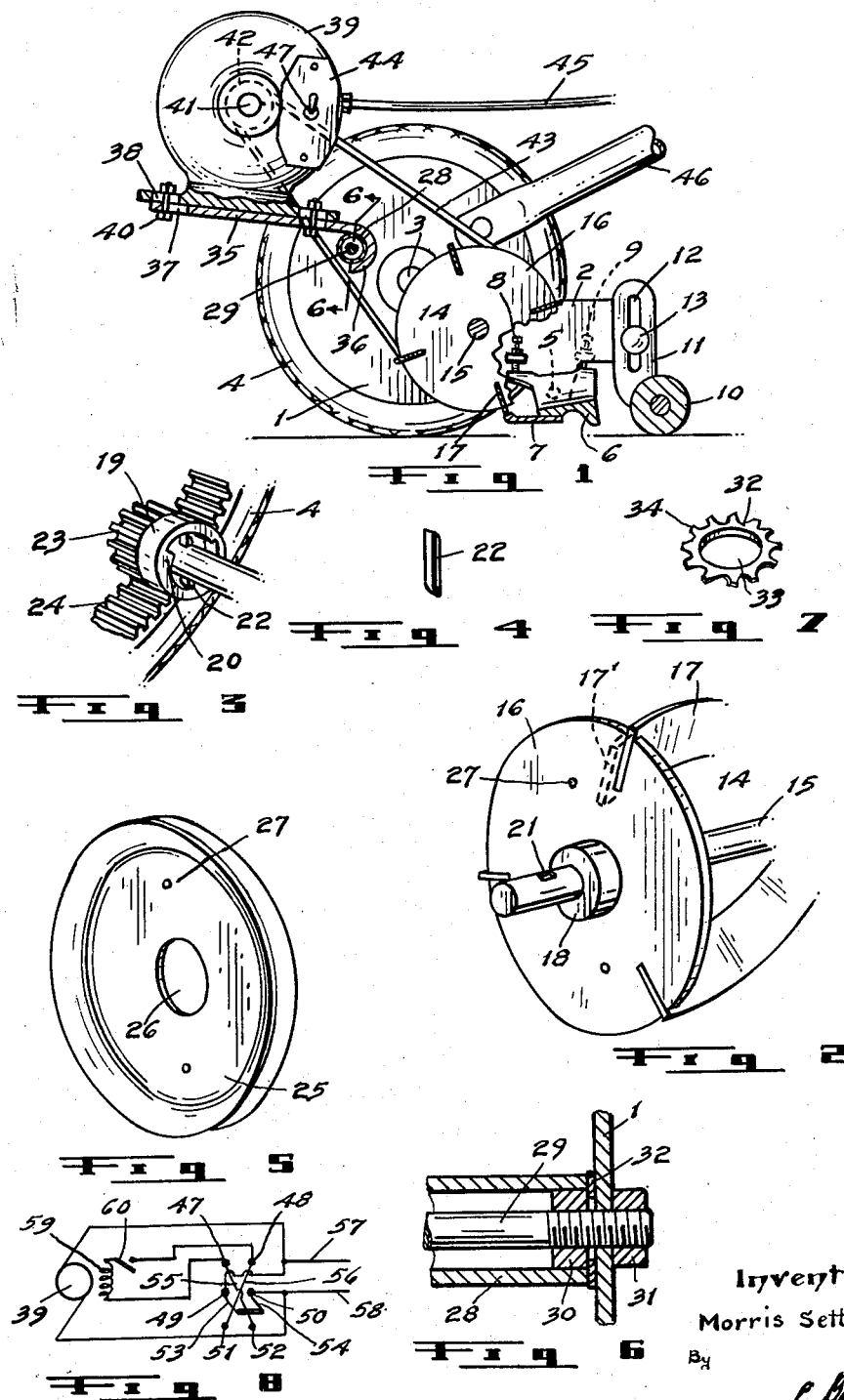
Inventor
Morris Settler
By
AGENT

United States Patent Office

2,700,264
Patented Jan. 25, 1955

2,700,264

POWER DRIVE FOR LAWN MOWERS

Morris Settler, Winnipeg, Manitoba, Canada

Application June 28, 1952, Serial No. 296,163

2 Claims. (Cl. 56—26)

The characteristics of a manually operated or household lawn mower are well known and its use is fairly common. When these machines were first brought out, the average house lawn was fairly small and the lawn cutting was no problem. The present trend however is toward large lawns, especially as cities expand into the suburbs, and the cutting of same becomes a chore. Accordingly, power machines are coming into general use.

It is well known to use an electric motor to drive the knife reel of a lawn mower and have the ground wheels free so the machine can be pushed by the operator. While the work is lightened, the pushing effort is still a problem. It is also known to attach a pulley to one of the ground wheels and drive same with an electric motor so that, through dogs, the knife reel will also be driven in one direction to cut the lawn as the machine moves thereover. In such arrangements, the motor turns when the machine moves in either direction, the motor usually prevents proper swinging of the handle for manually pushing the machine backward when the machine is being taken out or into storage, and if the machine is pushed forward, both the knife reel and the motor are driven.

The principal object of the present invention is to provide means for driving the knife reel of a lawn mower by a motor, and through the dogs normally associated with the reel and ground wheels, drive said ground wheels in a forward direction.

A further object of the invention is to mount the motor drive thereon such, that both a coarse and vernier belt tightening adjustment can be obtained between the motor and the knife reel.

A further object of the invention is to re-construct the mechanism such, that the lawn mower can be manually pushed forwardly over the ground without driving either the motor or the knife reel, and without changing the position of the handle.

A further object of the invention is to design the device such, that the reel knives and blade of the mower can be easily and quickly sharpened in direct relation with each other, by the use of the motor, and without removing said reel or blade from the machine, or driving the ground wheels thereof.

A still further object of the invention is to obtain the above mentioned objects by the addition of only a few parts and the re-assembling of old parts on the well known household lawn mower, and such that the change over can be accomplished at a very low cost.

With the above important and other minor objects in view, which will become more apparent as the description proceeds, the invention consists essentially in the construction, alteration and arrangement of the parts hereinafter more particularly described, reference being had to the accompanying drawings in which:

Figure 1 is a vertical sectional view across the knife reel and blade of a lawn mower, showing the motor thereon and connected for driving the reel.

Figure 2 is an enlarged perspective view of one end of the knife reel, and separate from the machine.

Figure 3 is a partial perspective view of the inner side of one of the ground wheels and showing the wheel teeth in mesh with the teeth of a driving dog positioned on an end of the reel shaft.

Figure 4 is an enlarged perspective view of one of the dog pawls.

Figure 5 is a perspective view of a pulley for attachment to the end of the knife reel shown in Figure 2.

Figure 6 is an enlarged sectional view taken on the dot and dash line 6—6, Figure 1.

Figure 7 is a perspective view of a lock washer used in the construction shown in Figure 6.

Figure 8 is a schematic diagram of the wiring hookup for reversing the motor.

In the drawings like characters of reference indicate corresponding parts in the several figures.

A description of an ordinary lawn mower is in order to understand the changes involved in this invention.

The frame of a lawn mower primarily comprises a pair of spaced cast discs 1, each having a rearwardly extending leg 2. The discs centrally carry removable axles 3 on which the ground wheels 4 rotate. The rear extending legs bearingly support, at 5, the central ends of a relatively flat cross casting 6, the front edge of which carries a cutting blade 7 positioned near the ground and between the ground wheels. The corners of the cross casting underlie the legs 2 so that front and rear adjusting screws 8 and 9 respectively, threaded in the legs and contacting said corners, can be turned to vary the angle of the casting and cutting bar on the bearings.

The extreme rear ends of the legs 2 are supported from a cross ground roller 10, through end brackets 11, the end brackets having vertical slots 12 therein. Bolts 13 pass through the slots 12 and through the legs so that, before being tightened, the legs can be raised or lowered from the roller for adjustable positions of the cutting blade 7 above the ground. When the bolts are tightened, the adjustment is secure.

A knife reel 14 is positioned between the wheel discs 1. This reel comprises a central shaft 15, having the ends thereof bearinged in the discs 1 for rotation thereon. This shaft carries suitable discs 16, the peripheries of which are secured to and support spiralled cross cutting knives 17, and the outer edges of these knives are adapted to pass over the face of the blade 7 as the reel rotates, for a scissor-shearing action. The knives usually project over the end discs, as indicated in dotted outline at 17', and the discs 16 are provided with large hubs 18 for a strong bearing on the shaft 15.

In order to clutch drive the knife reel, a dog member 19 is mounted on each end of the reel shaft 15. One end of these dogs is hollowed out in the form of interior circular ratchet teeth 20, the teeth on one dog being right and the teeth on the other dog being left. A rectangular-shaped hole 21 passes through the reel shaft near each end thereof and a pawl 22, shown in Figure 4, is adapted to be received in each of these holes. The ends of the pawls have opposite corners curved to ride the curves of the ratchet teeth 20 when the dogs are thereover and turn, while the uncurved corners catch the stepped faces of the ratchet teeth, so that the dogs can drive the reel shaft, when rotated in the correct direction, or the shaft can drive the dogs when it rotates in the opposite direction. The opposite ends of the dogs are provided with gear teeth 23 which mesh with interior teeth 24 formed on one side of the ground wheels 4.

When the ordinary lawn mower is pushed forwardly over a lawn, the teeth on the ground wheels 4 will drive the dog clutches which, through the pawls, will drive the reel. The knives of the reel, sweeping over the blade 7, will cut the grass of the lawn at a height set by the adjustment from the rear roller 10. On the other hand, if the lawn mower is pushed backwardly, the ratchet teeth of the dogs will slide over the pawls and the reel will not turn. The above is a general description of the ordinary lawn mower.

In installing this invention, the reel is removed from the machine and the ends 17' of the knives, at one end, are ground or otherwise cut off flush with the outer side of one of the end discs 16 (see Figure 2). A V-belt pulley 25, shown in Figure 5, is slid over this end of the reel shaft 15, a central hole 26 therein being received over the hub 18 to centre the pulley on the reel. This pulley is slightly smaller in diameter than the discs 16 so it will not interfere with the grass cutting. Aligned holes 27 may be drilled through both the pulley and the end disc so the two can be bolted or riveted together, or welding may be used. The reel is then re-inserted in the bearings of the discs 1, the clutches at this time being reversed.

In other words; the dog on the right hand end of the reel is placed on the left hand end and the dog on the left hand end is placed on the right hand end. Accordingly, when re-connected, the reel will stay stationary when the mower is pushed ahead and will be rotated when the mower is pushed backward. In the same way, if the reel is driven in a cutting direction with the blade 7, the ground wheels will be driven forwardly while, if the reel is driven backwardly, the ground wheels will remain stationary.

The household lawn mower is also provided with a front spacing cross rod. This rod is in advance of the reel and the ends are secured to the discs 1. In the machine shown in the present drawings, the spacing is obtained by a tie tubing 28 which abuts the discs 1 while a central rod 29, having threads at each end, acts as the tightener. The threaded ends pass through the discs 1 and nuts 30 and 31, on either side of the discs, lock the rod thereto, the nuts 30 being within the tubing and the corners thereof centering same. In the present arrangement, a lock washer 32, shown in Figure 7, is inserted at each end between the end of the tubing and the discs 1. These washers have a central hole 33 and outer teeth 34 which are slightly twisted so that, when compressed between two surfaces, the corners of the teeth will be inclined to bite into the surfaces and prevent rotation. Accordingly, when the tubing 28 is brought up tightly against these washers, it cannot turn.

A rectangular-shaped plate 35, having a hooked end 36, is hooked around the tubing 28 such, that it projects ahead of the machine. This plate may be secured to the tubing in any suitable manner, such as by welding. The plate is provided with spaced slots 37 for registration with slots 38 in the base of an electric motor 39, which is received on the plate. Bolts 40 pass through both slots to secure the motor to the plate and the slots permit a rough adjustment of the motor thereon. The motor has a drive shaft 41 which carries a small V-belt pulley 42 and this pulley is aligned edgewise with the pulley 25 on the reel so that a V-belt 43 can connect the two in driving relationship.

By observing Figure 1 it will be seen that the belt can be tightened by releasing the bolts 40 and moving the motor in relation to the plate 35, while what might be termed a vernier tightening can be obtained by keeping the bolts 40 tight, releasing the nuts 31, and rocking the motor on the tubing 28. The tightest vernier position would be when the motor shaft, the tubing 28, and the reel shaft are aligned.

The motor is provided with an electric outlet box 44 from which a power cable 45 extends, and this cable is suitably carried (not shown) on the handle 46 of the mower, from whence it can be plugged into any suitable electric power socket, the power being controlled by a suitable switch (not shown) mounted on the handle.

From the above disclosure it will be observed that, when power is applied to the motor, it will drive the reel, and the reel, through the clutches, drive the ground wheels in a forward direction and a lawn can be easily cut by an operator who merely has to steer the machine. When the motor is stopped, the operator can push the mower forward from the handle and the ground wheels will freely rotate without driving the reel or the motor. The washers 32 insure that the tubing 28 will not turn and so the motor will be amply supported.

One of the important features of this invention is the ease with which the mower knives and cutting blade can be sharpened. It is well known that by reversing the lead connections in the outlet box of the motor its rotation can be reversed. When the mower is to be sharpened, the cutting blade 7 is brought up into frictional engagement with the knives of the reel, by adjusting the screws 8 and 9. The leads in the motor outlet box are reversed so that, when power is applied, the motor will drive the reel backwardly. Grinding compound is then placed on the blade and knives and the motor started. At this time, the ground wheels will remain stationary but the power of the motor will drive the reel until the knives are ground in perfect engagement with the blade, and the grinding is complete when the reel turns freely. The grinding compound is then removed, the leads changed back for proper motor rotation and the machine is ready for lawn cutting without requiring any further manipulation of the screws 8 and 9.

To simplify the reversing of the motor, a hole is drilled through the cover plate of the outlet box and a small double pole dual knife switch is secured thereto, the body portion (not shown) being within the box and the operational toggle lever 47 being on the outside. This switch is indicated in Figure 8 and has six terminals 47 to 52, both inclusive. The knives 53 and 54 of the throw are hinged to the centre terminals and can be swung to connect these terminals with either set of end terminals by operation of the toggle lever 47. Before the switch is installed, the diagonal corner terminals are connected by shorts 55 and 56. The main wires from the cable 45 are indicated at 57 and 58 and connect to the centre terminals as well as to the field windings (not shown) of the motor 39. The motor starter coil is shown at 59 and is connected in series with a cut-out 60. The free end of the starter coil connects to the terminal 47 and the opposite side of the cut-out connects to the terminal 48.

From the above wiring it will be seen that the field windings are permanently connected to the main wires but the circuit to the starter coil can be reversed in the knife switch by operation of the toggle lever. In other words; when the knives of the throw connect with the terminals 47 and 48 and the power is turned on, the motor will start in one direction, and when the knives connect to the terminals 51 and 52 and the power is turned on, the motor will start in the opposite direction. Accordingly, by installing this knife switch, as above described, an adjustment of the mower blade and a simple manual throw of the toggle lever will permit the lawn mower owner to do his own mower sharpening with a minimum of effort.

What I claim as my invention is:

1. A power drive for a lawn mower having a pair of ground wheels and a rotatable knife reel axially positioned behind the axis of said ground wheels, comprising: a support plate having the rear edge thereof pivotally mounted about an axis on said mower in front of the axis of said ground wheels; a motor carried above and by said support plate; an endless driving connection between the drive shaft of the motor and the knife reel; said support plate swingable on said mower axis to bring the axis of the motor shaft toward cross sectional alignment with the said axis on the mower and the axis of the knife reel, to tighten said driving connection; and means for driving said ground wheels from said knife reel.

2. A power drive for a lawn mower having a pair of ground wheels and a rotatable knife reel thereon axially positioned behind and below the axis of said ground wheels, comprising: a support plate having the rear edge thereof pivotally mounted about an axis on said mower in front and above the axis of said ground wheels; an electric motor supported on said support plate; an endless driving connection between the drive shaft of the motor and the knife reel; said support plate adjustably swingable on said mower axis, under the weight of said motor, to bring the axis of the motor shaft toward cross sectional alignment with the said axis on the mower and the axis of the knife reel, to tighten said driving connection; unidirectional driving clutches between said knife reel and the ground wheels of said mower for forward driving of said ground wheels; and switch means connected between the starter leads of and the wiring to said motor to reverse the direction of rotation thereof when power is applied thereto.

References Cited in the file of this patent

UNITED STATES PATENTS

| Number | Name | Date |
|---|---|---|
| 528,608 | Richter | Nov. 6, 1894 |
| 1,256,010 | Gally | Feb. 12, 1918 |
| 1,734,713 | Carlson | Nov. 5, 1929 |
| 2,468,839 | Rodesci | May 3, 1949 |
| 2,507,423 | Schweizer | May 9, 1950 |